United States Patent [19]

Skog

[11] Patent Number: 4,593,851

[45] Date of Patent: Jun. 10, 1986

[54] METHOD OF CONNECTING ELEMENTS BY BRAZING

[75] Inventor: Erik Skog, Vellinge, Sweden

[73] Assignee: United Stirling AB, Sweden

[21] Appl. No.: 631,788

[22] Filed: Jul. 17, 1984

[51] Int. Cl.$^4$ ............................................. B23K 35/12
[52] U.S. Cl. .................................................. 228/248
[58] Field of Search ......................................... 228/248

[56] References Cited

U.S. PATENT DOCUMENTS

| | | | |
|---|---|---|---|
| 2,390,452 | 12/1945 | Mudge | 228/248 X |
| 2,835,967 | 5/1958 | Umblia | 228/248 X |
| 2,908,072 | 10/1959 | Johnson | 228/248 X |
| 3,442,010 | 5/1969 | Albers | 228/248 |
| 3,971,501 | 7/1976 | Cooke | 228/248 |
| 4,391,855 | 7/1983 | Geeck | 427/386 X |
| 4,544,581 | 10/1985 | Pelloski | 427/383.7 |

FOREIGN PATENT DOCUMENTS 2004489  4/1979  United Kingdom ................ 228/248

OTHER PUBLICATIONS

Wall Colmonoy Corp. pub., "NICROBRAZ Engineering Data Sheet No. 2.1.11 Rev. A", C. 1969.

*Primary Examiner*—Nicholas P. Godici
*Assistant Examiner*—Carmine Cuda
*Attorney, Agent, or Firm*—Finnegan, Henderson, Farabow, Garrett & Dunner

[57] ABSTRACT

Braze connection of elements may be performed using as brazing material a slurry comprising a metal powder, an anti-settling agent and preferably a dissolved plastic material.

4 Claims, No Drawings

METHOD OF CONNECTING ELEMENTS BY BRAZING

This invention relates to a method of connecting elements by brazing.

More particularly the invention relates to a method of connecting elements by brazing comprising the steps of
 (a) preparing surfaces of the elements to be connected by brazing, e.g., by cleaning or metallizing
 (b) arranging the elements in fixed, selected relative positions
 (c) applying brazing material
 (d) heating the elements to a predetermined temperature during a predetermined time interval.

Constructions exposed to high temperatures, corrosive gases or high mechanical stresses or combinations of such exposures are often made of ceramics or high temperature alloys. Such materials may be difficult to braze. The brazing may involve a heat treatment which is detrimental to the material of the elements to be connected, or the brazing material necesary to obtain the desired properties of the construction may be difficult or impossible to select.

As an example it could be mentioned that heater tubes for Stirling engines should be provided with surface enlarging fins along a part of their length. The fins should be connected by brazing and are located with gaps of about 1 mm between adjacent fins. The tubes may be made of nickel-base alloy INCONEL 625 and the fins may be made of 310 SS (stainless steel). INCONEL is a Trademark of Huntington Alloys, Inc., and 310 SS is AISI Standard.

The surfaces to be connected may be cleaned by mechanical treatment and held in proper relationship by a fixture. A brazing filler metal powder—such as the one sold under the trade mark NICROBRAZ (Trade Mark of Wall Colmonoy Corporation) mixed with a plastic material such as NICROBRAZ cement is applied as a paste to the elements to be brazed together. After heating in a vacuum the brazing is completed, but it is difficult to prevent surplus brazing material from accumulating and blocking some of the gaps between the fins.

The alternative—the use of less brazing material—will result in poor brazing of some of the fins.

The object of the present invention is to provide an improved method of connecting elements by brazing by which the above drawback is avoided, and according to the present invention this is obtained thereby that the brazing material prior to its application is prepared by mixing a metal powder with an anti-settling agent.

Anti-settling agents are commonly used in paints. For example an anti-settling agent is sold under the trade mark M-P-A 60X (Trade Mark of NL Industries, Inc). Such an agent is normally a rather dry jelly which when agitated with a powder becomes fluid. A mixture of 90 percent by weight of NICROBRAZ metal powder and 10 percent by weight of M-P-A 60X will form a slurry, the viscosity of which is adjusted with a suitable amount of dissolved plastic material, e.g., NICROBRAZ cement. The element to be connected by brazing may be dipped in the slurry or the slurry may be applied to the element by a syringe, an eye dropper or a brush.

The advantage of using the anti-settling agent is that the metal powder will be evenly distributed in the slurry independently of the density and viscosity of the slurry. This makes it possible to use the brazing material also as a coating, e.g., to protect the elements against influence of corrosive gases. The slurry makes it possible to use a predetermined amount of brazing material within very narrow limits and thus it is possible to provide tubes with fins leaving gaps smaller than 0.5 mm between them. This has hitherto not been possible.

The invention will be described by the following Examples of preferred methods.

EXAMPLE 1

A tube having 4.5 mm outer diameter was provided with fins of 0.6 mm thickness spaced 0.5 mm apart. The tube was made of INCONEL 625 and the fins of AISI 310 SS. The parts were vapor degreased with chloroethene and mounted in a jig.

A slurry containing 100 parts (by weight) NICROBRAZ 150, 10 parts M-P-A 60, 80 parts NICROBRAZ Cement 400 and 10 parts NICROBRAZ Cement 500 was prepared.

The tube was dipped in the slurry before being mounted in the jig, and the parts were left to dry in a position such that the fins were in vertical plans.

After drying (vaporizing of the solvent) the increase in weight of the tube and the fins was measured to 4 g.

The tube was now heated to 400° C. in a vacuum furnace and kept at said temperature during 10 minutes—the time necessary to evaporate or decompose the plastic material contained in the brazing material and to restore the vacuum.

The temperature in the furnace was now elevated to 950° C. and kept at said level for 30 minutes.

Finally the brazing was performed by raising the temperature to 1150° C. and maintaining said temperature for 15 minutes. The furnace was now allowed to cool off.

EXAMPLE 2

A tube having an outer diameter of 4.5 mm and made of INCONEL 625 was braze connected to a container made of XF-818 cast alloy.

The brazing operation was the same as that described in Example 1 except for the composition of the slurry which consisted of

| 100 parts (weight) | NICROBRAZ 100 |
| 10 parts | M-P-A 60 | and a few drops of NICROBRAZ 500 making the slurry suitable for application by means of a syringe.

I claim:

1. A method of connecting elements by brazing, comprising the steps of:
 (a) preparing the surfaces of said elements to be connected by cleaning or metallizing said surfaces;
 (b) arranging said elements in fixed, selected, relative positions;
 (c) applying a fluid brazing material to said surfaces, said brazing material comprising a mixture of a metal powder and an anti-settling agent, said anti-settling agent becoming a fluid when mixed with said metal powder and agitated; and
 (d) heating said elements to a predetermined temperature to braze said elements.

2. The method according to claim 1, wherein said applying step includes dipping said elements into said fluid brazing material.

3. The method according to claim 1, wherein said fluid brazing material further comprises a dissolved plastic material added to said mixture of metal powder and anti-settling agent to adjust the viscosity of said brazing material.

4. The method according to claim 1, wherein said brazing material comprises about 90–100 parts by weight of said metal powder and about 10 parts by weight of said anti-settling agent.

* * * * *